United States Patent
Oikawa

(10) Patent No.: US 9,759,297 B2
(45) Date of Patent: Sep. 12, 2017

(54) RACK INCLUDING FORCING UNIT AND OPTICAL APPARATUS HAVING THE SAME

(71) Applicant: CANON KABUSHIKI KAISHA, Tokyo (JP)

(72) Inventor: Keiki Oikawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 14/296,581

(22) Filed: Jun. 5, 2014

(65) Prior Publication Data
US 2014/0373653 A1    Dec. 25, 2014

(30) Foreign Application Priority Data

Jun. 20, 2013 (JP) ................................. 2013-129414

(51) Int. Cl.
*F16H 25/20* (2006.01)
*G02B 7/10* (2006.01)
*F16H 25/24* (2006.01)

(52) U.S. Cl.
CPC ......... *F16H 25/2009* (2013.01); *G02B 7/102* (2013.01); *F16H 25/2409* (2013.01); *Y10T 74/18576* (2015.01)

(58) Field of Classification Search
CPC . F16H 25/2009; F16H 25/2409; G02B 7/102; Y10T 74/18576; H04N 5/2254
See application file for complete search history.

(56) References Cited

U.S. PATENT DOCUMENTS

| | | | | |
|---|---|---|---|---|
| 7,126,763 | B2* | 10/2006 | Sasaki | G02B 7/022 359/696 |
| 2008/0148892 | A1* | 6/2008 | Sato | G02B 7/102 74/422 |
| 2008/0174882 | A1* | 7/2008 | Asano | G02B 7/102 359/694 |
| 2012/0176691 | A1* | 7/2012 | Hirabayashi | G02B 7/021 359/813 |

FOREIGN PATENT DOCUMENTS

JP    2005-315935 A    11/2005

* cited by examiner

*Primary Examiner* — Gevell Selby
(74) *Attorney, Agent, or Firm* — Rossi, Kimms & McDowell LLP

(57) ABSTRACT

A rack includes a first member including a main tooth, a second member including an opposite tooth disposed opposite the main tooth, the second member being rotatable with respect to the first member, a first forcing unit configured to force the main tooth, and a second forcing unit configured to force the main tooth and the opposite tooth closer to each other. On a plane perpendicular to a central axis of a lead screw, each of a part at which the first forcing unit forces the first member, a part at which the second forcing unit forces the first member, and a part at which the second forcing unit forces the second member is disposed on a movable member side with respect to a straight line connecting a rotating axis of the second member and the central axis.

17 Claims, 7 Drawing Sheets

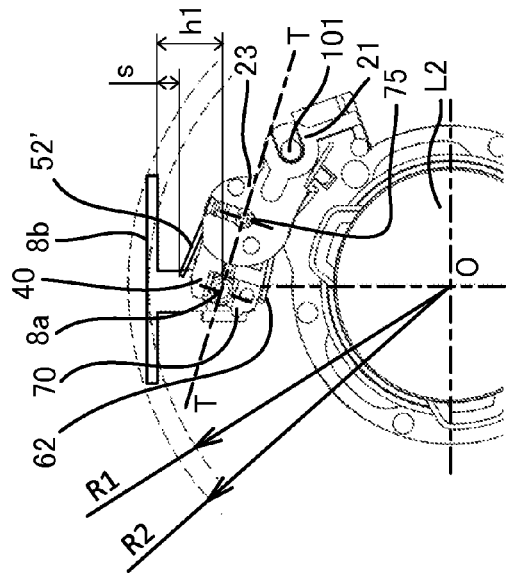
FIG. 6A
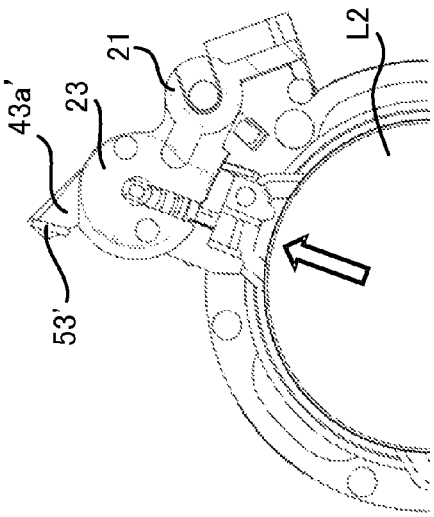
FIG. 6B
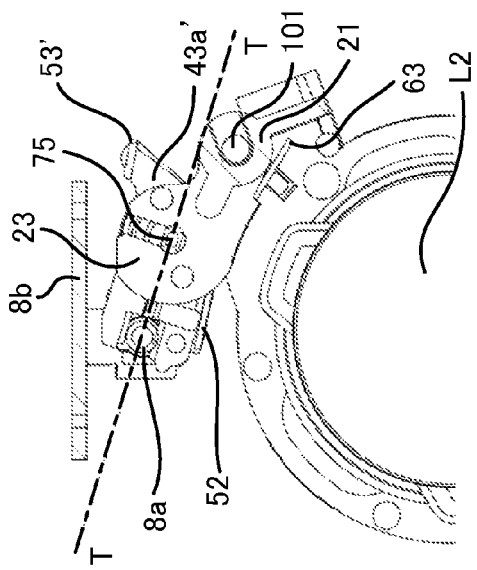
FIG. 6C
FIG. 6D

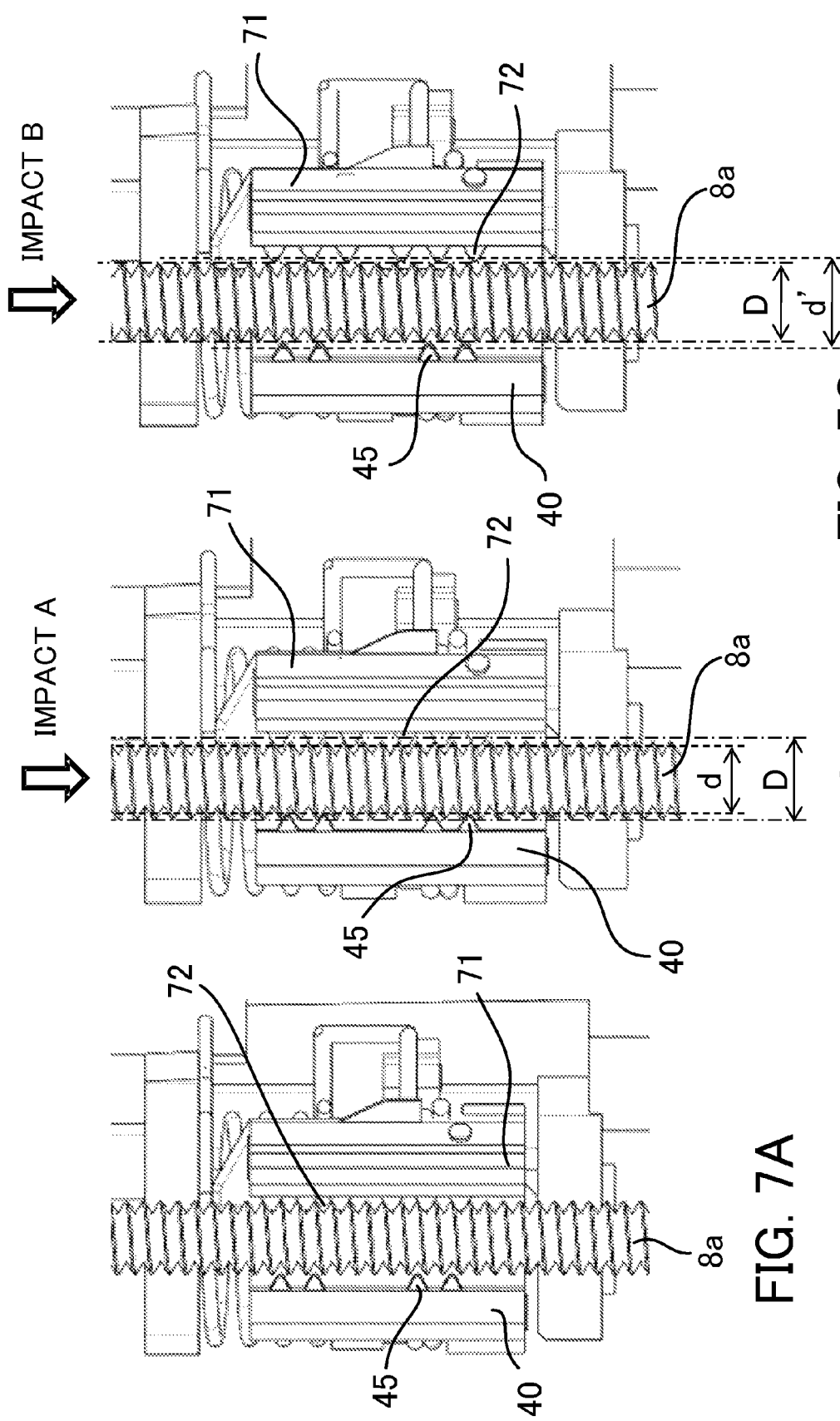

RACK INCLUDING FORCING UNIT AND OPTICAL APPARATUS HAVING THE SAME

BACKGROUND OF THE INVENTION

Field of the Invention

The present invention relates to a rack and an optical apparatus having the same.

Description of the Related Art

Downsizing of optical apparatuses, such as a digital still camera and a digital video camera, requires downsizing of a lens barrel mounted onto them. Power saving of the lens barrel is also required in order to downsize a battery and extend the maximum duration of shooting. Japanese Patent Laid-open No. 2005-315935 discloses a movement mechanism including a motor and a rack to move a lens holding frame in an optical axis direction and a torsion coil spring to force the rack against a lead screw of the motor in a lens barrel.

In a rack configured to hold a lead screw using a main tooth and a pinching tooth, an impact due to a drop, for example, causes a tooth jump of the main tooth and the pinching tooth off a thread of the lead screw, resulting in disturbance and blur in a captured image. When a strong force is applied between the rack and the lead screw to prevent a tooth jump as disclosed in Japanese Patent Laid-open No. 2005-315935, an increase in fractional force between them leads to an increase in a rotational load on the motor, thereby hindering power saving of the motor, or increasing the size of the motor and hence the size of the lens barrel. In contrast, in a rack configured to engage only a forced main tooth with a lead screw in a normal state, an opposite tooth disposed opposite the main tooth with respect to the axis of the lead screw becomes engaged with the thread of the lead screw when an impact is applied, thereby preventing the rack from a shift in position in the axis direction of the lead screw. With an extremely strong impact, however, a strong shearing force is applied on the tip of the main tooth to potentially chip off the main tooth, which can causes operational failure.

Along with recent downsizing demands of the digital camera and digital video camera, downsizing of the rack also becomes necessary.

SUMMARY OF THE INVENTION

The present, invention provides a rack and an optical apparatus having the same, which rack is configured to reduce a driving load with a small configuration, preventing a tooth jump due to an impact of certain strength, and preventing breakage of a main tooth due to an extremely strong impact.

A rack according to the present invention is mounted to a movable member and configured to transfer a driving power of a driver to the movable member. The rack includes a first member including a main tooth to be engaged with a lead screw rotated by the driver, a second member including an opposite tooth disposed opposite the main tooth with respect to the lead screw and engageable with the lead screw, the second member being rotatable with respect to the first member, a first forcing unit configured to force the main tooth against the lead screw, and a second forcing unit configured to force the main tooth and the opposite tooth closer to each other. On a plane perpendicular to the central axis of the lead screw, each of a part at which the first forcing unit forces the first member, a part at which the second forcing unit forces the first member, and a part at which the second forcing unit forces the second member is disposed on a movable member side with respect to a straight line connecting a rotating axis of the second member and the central axis of the lead screw.

Further features of the present invention will become apparent, from the following description of exemplary embodiments with reference to the attached drawings.

BRIEF DESCRIPTION OF THE DRAWINGS

FIG. 6A is a side view of FIG. 2, and FIGS. 6B to 6D are side views of configurations to be compared to that in FIG. 6A.

FIGS. 7A to 7C are side views for explaining the operation of the rack illustrated in FIG. 2.

DESCRIPTION OF THE EMBODIMENTS

Figure 1:
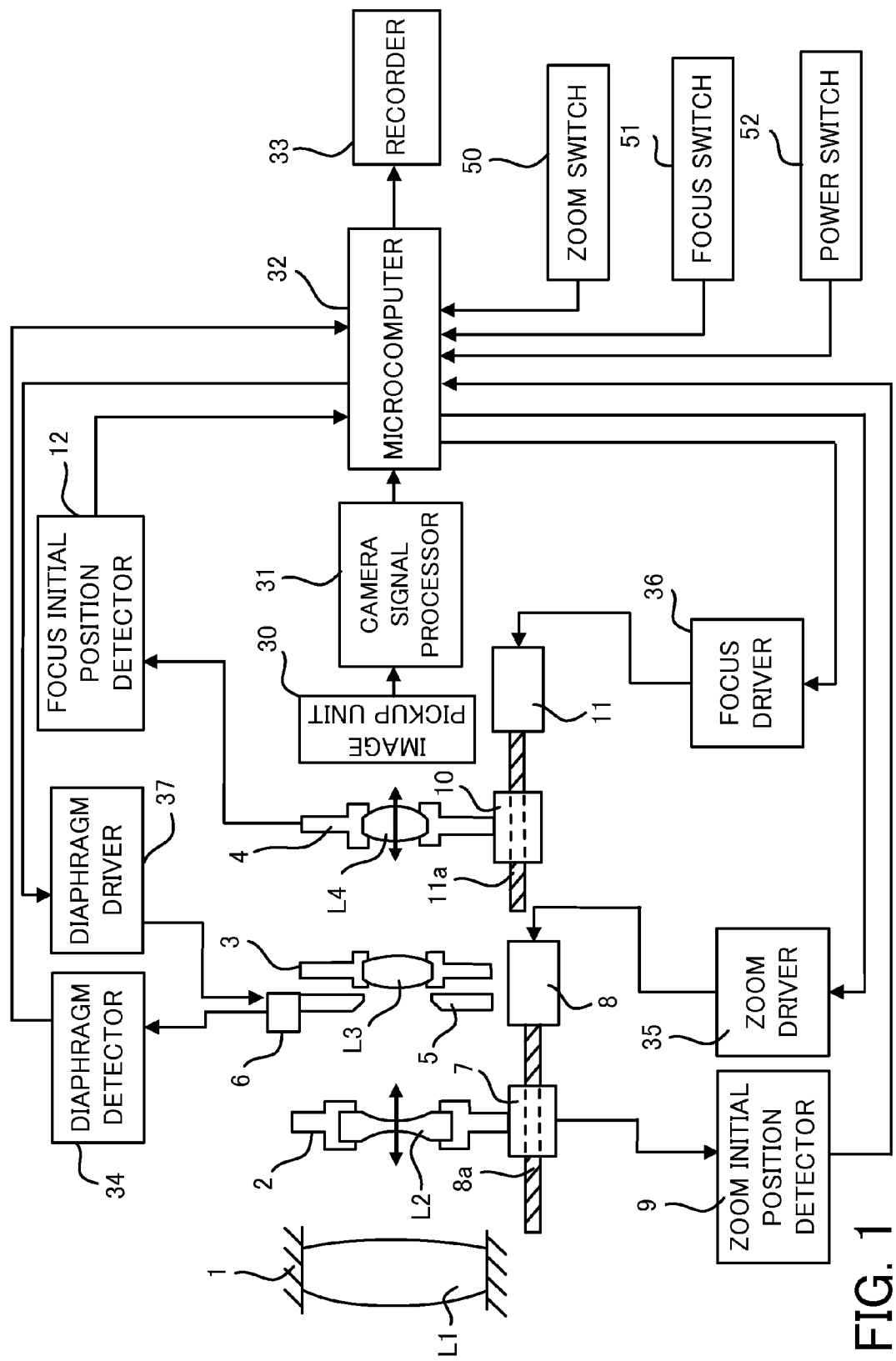
FIG. 1 is a block diagram of an image pickup apparatus according to this embodiment of the present invention.

FIG. 1 is a block diagram of an optical apparatus (image pickup apparatus). The optical apparatus according to this embodiment of the prevent invention is a lens integrated camera, but the present invention is also applicable to a camera system with a lens barrel detachably mounted to a camera body. The optical apparatus is also applicable to a single-lens reflex camera, a digital still camera, and a digital video camera, for example. The lens barrel is an image pickup optical system for forming an optical image of an object.

In FIG. 1, the left side is the object side, whereas the right side is the image side. The image pickup optical system in the present embodiment includes a variable-magnification optical system exemplarily including four lens units. Reference numeral L1 denotes a first lens unit that is fixed in a magnification-varying operation and has a positive refractive power. Reference numeral L2 denotes a second lens unit (magnification-varying lens unit or zoom lens unit) that is configured to move in an optical axis direction as indicated by an arrow to perform a magnification-varying operation (changes a focal distance) and has a negative refractive power. Reference numeral L3 denotes a third lens unit that is fixed and has a positive refractive power. Reference numeral L4 denotes a fourth lens unit (focus lens unit) that is configured to move in the optical axis direction as indicated by an arrow for focusing and has a positive refractive power.

Reference numeral 1 denotes a front lens barrel holding the first lens unit L1, reference numeral 2 denotes a first movable member holding the second lens unit L2 as a first magnification-varying lens unit, reference numeral 3 denotes a fixed member holding the third lens unit L3, and reference numeral 4 denotes a second movable member holding the fourth lens unit L4. An image pickup unit (image pickup element) 30 including a CCD or CMOS, a low-pass filter, and an infrared cut filter is fixedly held by a rear lens barrel not illustrated and performs a photoelectric conversion on an optical image formed by the image pickup optical system.

Reference numeral 31 denotes a camera signal processor that performs predetermined amplification and gamma correction on an output of the image pickup unit 30. Reference numeral 32 denotes a microcomputer serving as a controller that performs control of the optical apparatus and the like by receiving a large number of signals, performing signal processing on them, and outputting a large number of signals in response to an input signal. Reference numeral 33 denotes a recorder configured to record an image signal subjected to signal processing at the microcomputer 32, recording conditions, and the like. Reference numeral 50 denotes a zoom switch for instructing a magnification-varying operation. Reference numeral 51 denotes a focus switch through which a photographer instructs a manual focus operation (focusing operation). Reference numeral 52 denotes a power switch.

The first movable member 2 is movably supported in the optical axis direction of the image pickup optical system by two guiding bars 101 and 102 to be described later. The second movable member 4 is movably supported in the optical axis direction by guiding bars not illustrated in FIG. 1.

Reference numeral 5 denotes a diaphragm mechanism configured to adjust the intensity of light incident on the image pickup unit 30 and is of a guillotine type configured to move two diaphragm blades by a drive unit 6 in respective directions opposite to each other to change the aperture diameter. Reference numeral 34 denotes a diaphragm detector configured to detect a rotational position of a driving magnet of the drive unit 6 of the diaphragm mechanism by a Hall sensor. The camera signal processor 31 provides the amplification and gamma correction to a signal from the image pickup unit 30 and outputs a resulting signal to the microcomputer 32. The microcomputer 32 outputs a diaphragm drive signal to a diaphragm driver 37 according to an input, signal from the camera signal processor 31 and an input signal, such as the amount of rotation of the diaphragm drive unit from the diaphragm detector, thereby adjusting the intensity of light.

Reference numeral 3 denotes a zoom motor serving as a driver (actuator) configured to vary a magnification by moving the second lens unit L2 in the optical axis direction. The zoom motor 8 rotates a lead screw (lead screw) 8a that is engaged with a rack 7 mounted to the first movable member 2 that is held movably in the optical axis direction. The rotation of the zoom motor 8 moves the first movable member 2 in the optical axis direction. The lead screw 8a is disposed concentrically with a rotor included in the zoom motor and in parallel to the optical axis. The lead screw 8a is formed of, for example, SUS or steel. Reference numeral 8b denotes a motor plate.

Reference numeral 9 denotes a zoom initial position detector including a photo-interrupter. The zoom initial position detector 9 optically detects shielding and transmitting of light as a light-shielding unit (not illustrated) formed in the first movable member 2 moves in the optical axis direction, thereby detecting a reference position (zoom initial position) of the first movable member 2 in the optical axis direction.

When the power switch 52 is turned on, the zoom motor 8 receives a drive signal from a zoom driver 35 under control of the microcomputer 32. Using the zoom initial position as a reference detected by the zoom initial position detector 9, the first movable member 2 moves to a predetermined position and stands by. The zoom motor 8 is position-controlled based on the number of steps from the zoom initial position in accordance with an operation of the zoom switch 50. Upon the operation of the zoom switch 50, the microcomputer 32 determines in which moving direction the operation is performed and provides zooming accordingly.

Reference numeral 11 denotes a focus motor serving as a driver (actuator) that moves the fourth lens unit L4 in the optical axis direction for focusing. The focus motor 11 rotates a lead screw (lead screw) 11a that is engaged with a rack member 10 installed in the second movable member 4 that is held movably in the optical axis direction. The rotation of the focus motor 11 moves the second movable member 4 in the optical axis direction. The lead screw 11a is disposed concentrically with a rotor included in the focus motor and in parallel to the optical axis.

Reference numeral 12 denotes a focus initial position detector including a photo-interrupter. The focus initial position detector 12 optically detects shielding and transmitting of light when a light-shielding unit (not illustrated) formed in the second movable member 4 moves in the optical axis direction, thereby detecting a reference position (focus initial position) of the second movable member 4 in the optical axis direction.

When the power switch 52 is turned on, the focus motor 11 receives a drive signal from a focus driver 36 under control of the microcomputer 32. Using the focus initial position detected by the focus initial position detector 12 as a reference, the second movable member 4 moves to a predetermined position and stands by. The focus motor 11 is position-controlled based on the number of steps from the focus initial position in accordance with operations of the zoom switch 50 and the focus switch 51. In autofocusing, the focus driver 36 energizes the focus motor 11 according to an input signal from the microcomputer 32 and drives the fourth lens unit L4 in the optical axis direction.

Next follows a description of the rack (rack unit) 7 according to this embodiment. The rack 7 is mounted onto the first movable member 2 and transfers driving power of the zoom motor 8 into the first movable member 2.

Figure 2:
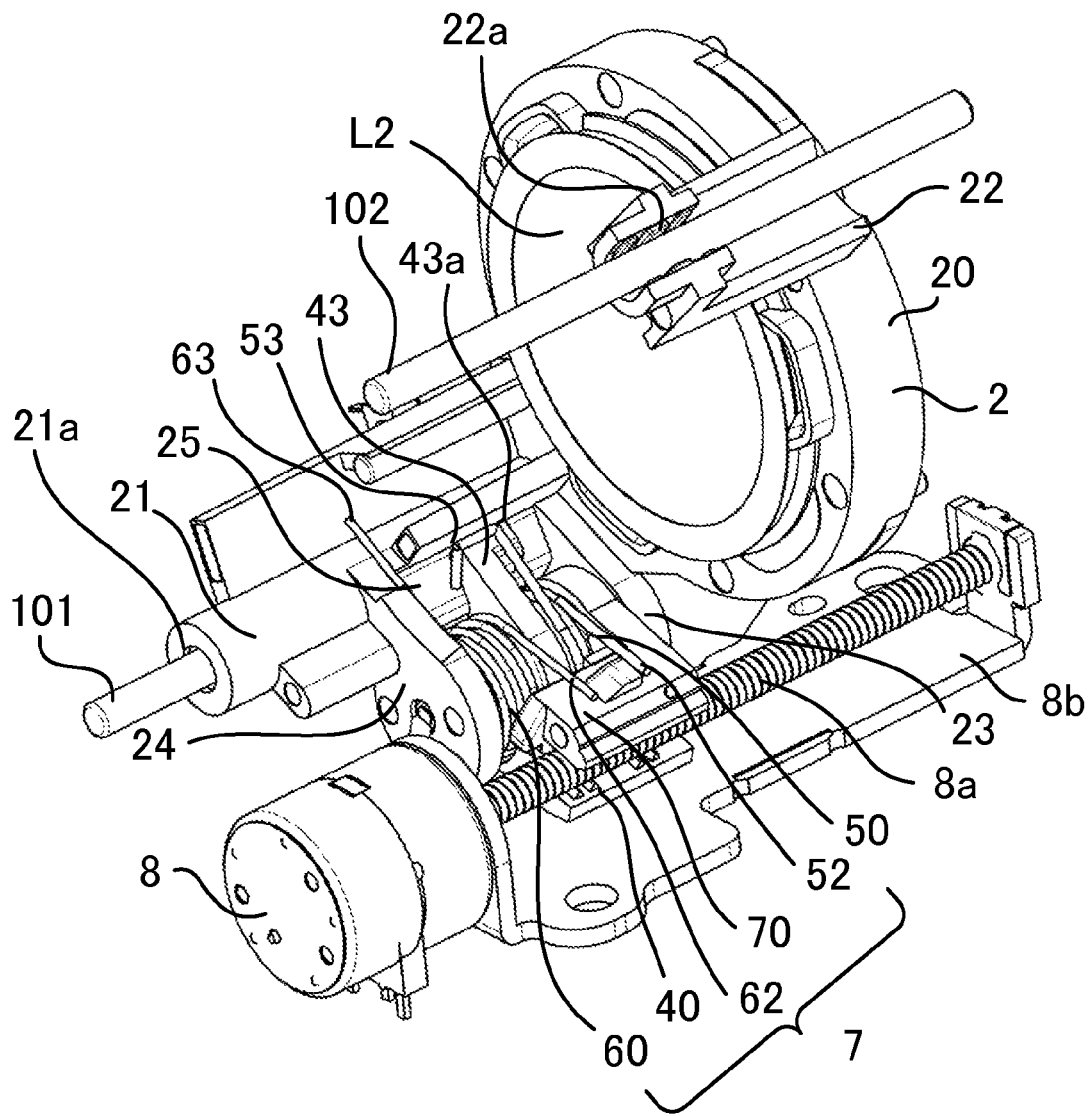
FIG. 2 is a perspective diagram of the configuration around a rack in the image pickup apparatus illustrated in FIG. 1.

FIG. 2 is a perspective diagram around the rack 7 in the image pickup apparatus. As illustrated, the first movable member 2 includes a body 20, a sleeve 21, a baffle 22, and a rack holder. The body 20 holds the second lens unit L2 at the center and has a substantially cylindrical shape. The sleeve 21 is fixed onto the body 20 and has a through-hole 21a through which the guiding bar 101 is inserted. The baffle 22 is fixed onto the body 20 and has a recess 22a through which the guiding bar 102 is inserted. In this configuration, the first movable member 2 is movably supported in the optical axis direction, and guided by the guiding bars 101 and 102.

The rack holder rotatably holds the rack 7 and includes two blocks 23 and 24 that each has a shaft hole, and a recess 25 between the blocks. The recess 25 houses the rack 7 whose part, protrudes from the recess. Both ends of a shaft 75 of a main rack 70 to be described later are rotatably supported in shaft holes 23a and 24a of the blocks 23 and 24, respectively. The part of the rack 7 protruding from the recess 25 is engaged with the lead screw 8a of the zoom motor 3 serving as a driver.

Figure 3A:
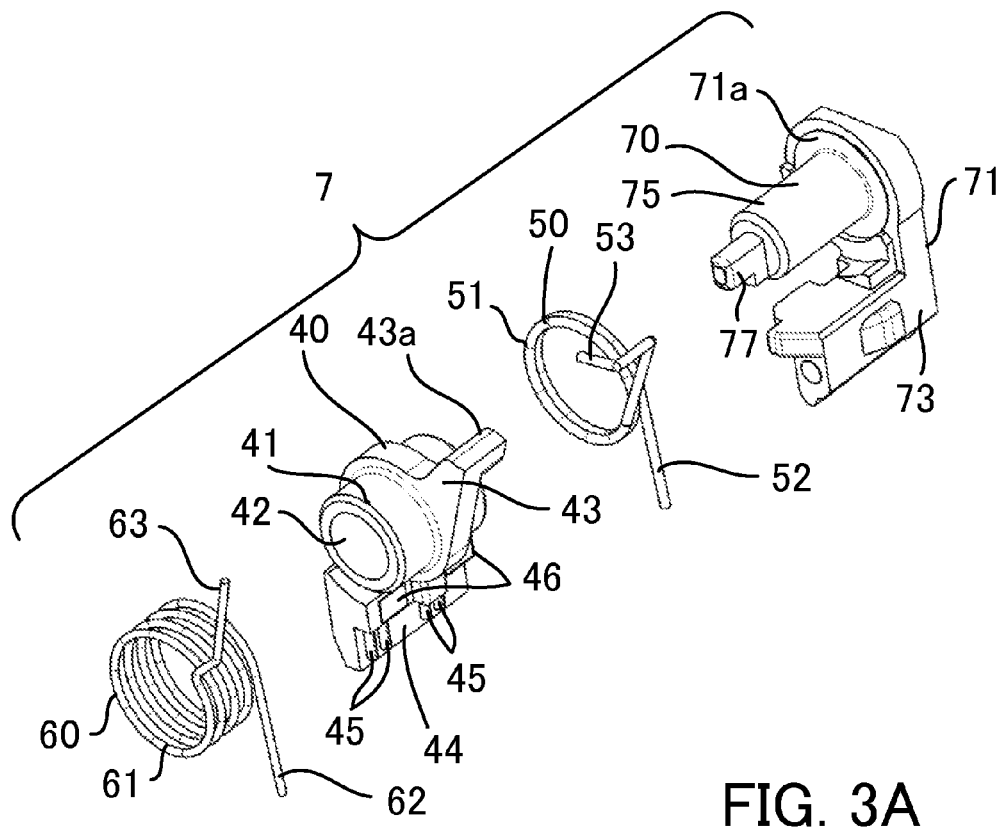
FIGS. 3A and 3B are exploded perspective views of the rack illustrated in FIG. 2 viewed in different directions.
Figure 3B:
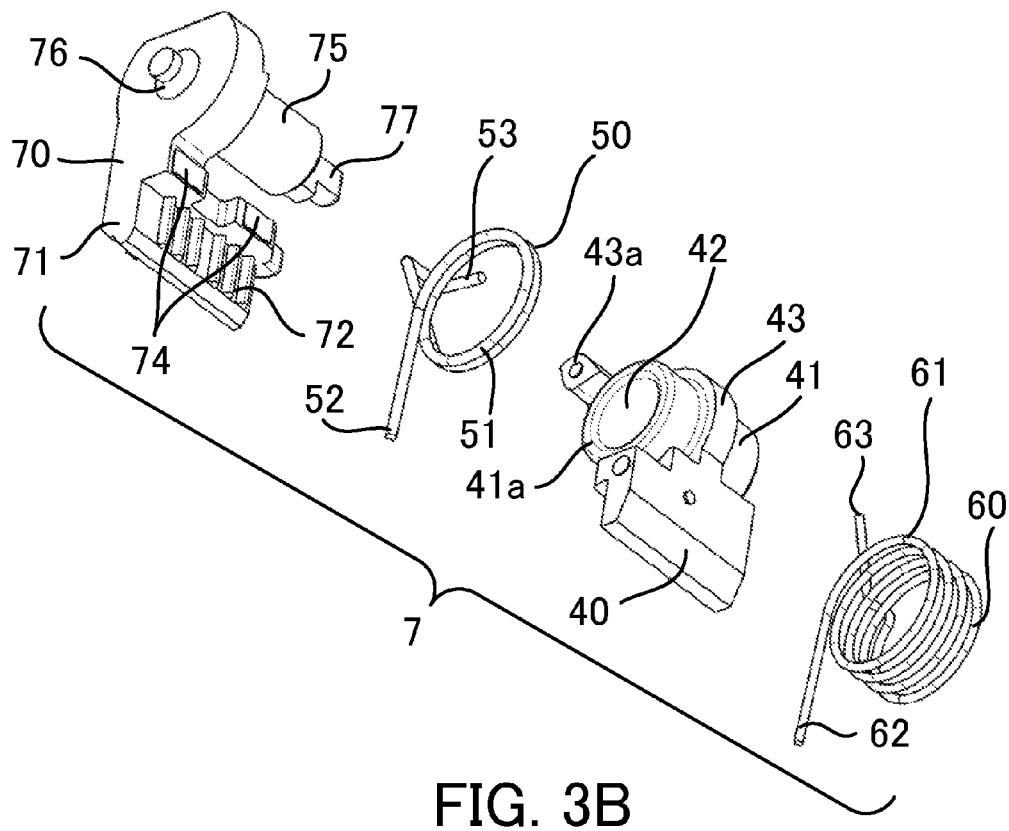

FIGS. 3A and 3B are exploded perspective views of the rack 7 viewed in different directions. The rack 7 includes the main rack 70, a sub rack 40, a pinching spring 50, and a torsion coil spring 60, and is downsized. The main rack 70 and the sub rack 40 are made of POM, PC, etc., and formed by molding, pressing, machining of metal, for example.

The main rack 70 includes an engaged member (first member) 71 and the shaft 75.

As illustrated in FIG. 2 and FIGS. 3A and 3B, the engaged member 71 has an L shape when viewed from the front, is connected to the shaft 75 at one end of the L shape, and is formed as an arm sticking out from the connection part and bending substantially in parallel to the shaft. Reference numeral 71a denotes a contact surface that is the inner surface of the end engaged with the shaft 75 of the engaged member 71.

The engaged member 71 has a main tooth 72 on the lead screw side. The main tooth 72 is engaged with the thread of the lead screw 8a and receives a driving power of the zoom motor 8 from the lead screw 8a. As illustrated in FIGS. 3A and 3B, a surface 73 opposite the lead screw 8a of the engaged member 71 functions as an engagement surface engageable with an arm 52 of the pinching spring 50 and an arm 62 of the torsion coil spring 60. As illustrated in FIG. 3B, two stoppers (restricting units) 74 are formed inside (on the shaft 75 side) of the main tooth 72 of the engaged member 71 as protrusions protruding toward the lead screw from the main tooth 72.

As illustrated in FIGS. 3A and 3B, the shaft 75 penetrates through a coil 51 of the pinching spring 50, a shaft hole 42 of a body 41 of the sub rack 40, and a coil 61 of the torsion coil spring 60 in this order. The shaft 75 is rotatably supported in the shaft holes 23a and 24a of the two blocks 23 and 24, respectively, of the rack holder of the first movable member 2. The shaft 75 functions as the rotating axis of the rack 7.

Figure 4A:
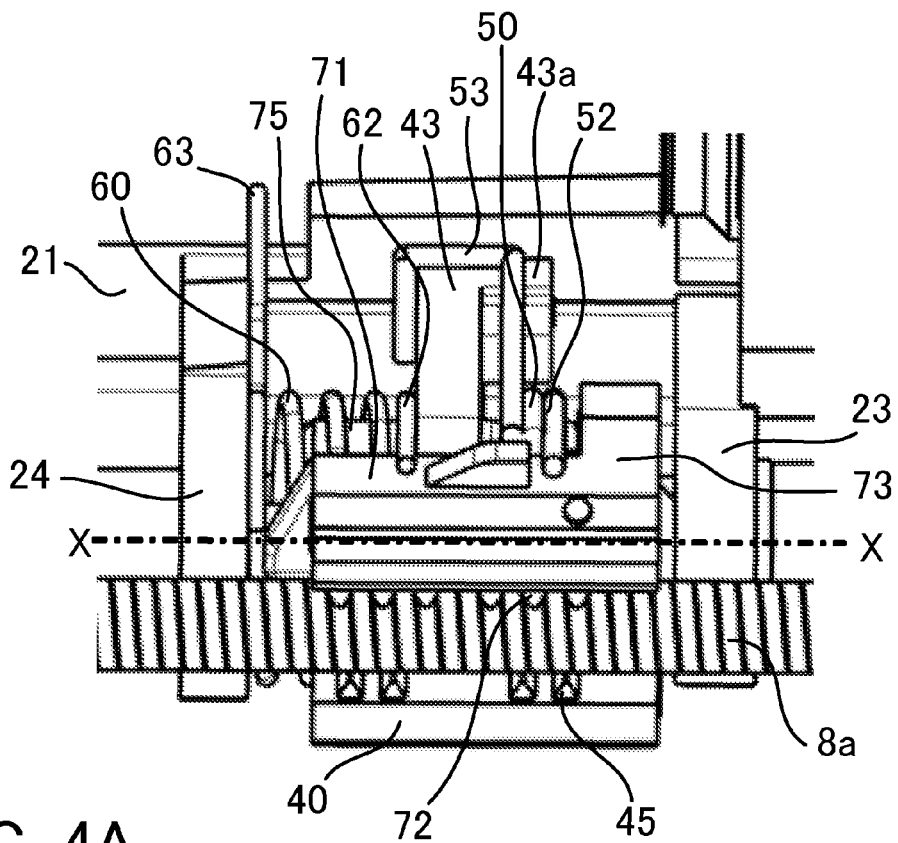
FIGS. 4A and 4B are a partially enlarged perspective diagram and a cross-sectional view, respectively, around the rack in FIG. 2.
Figure 4B:
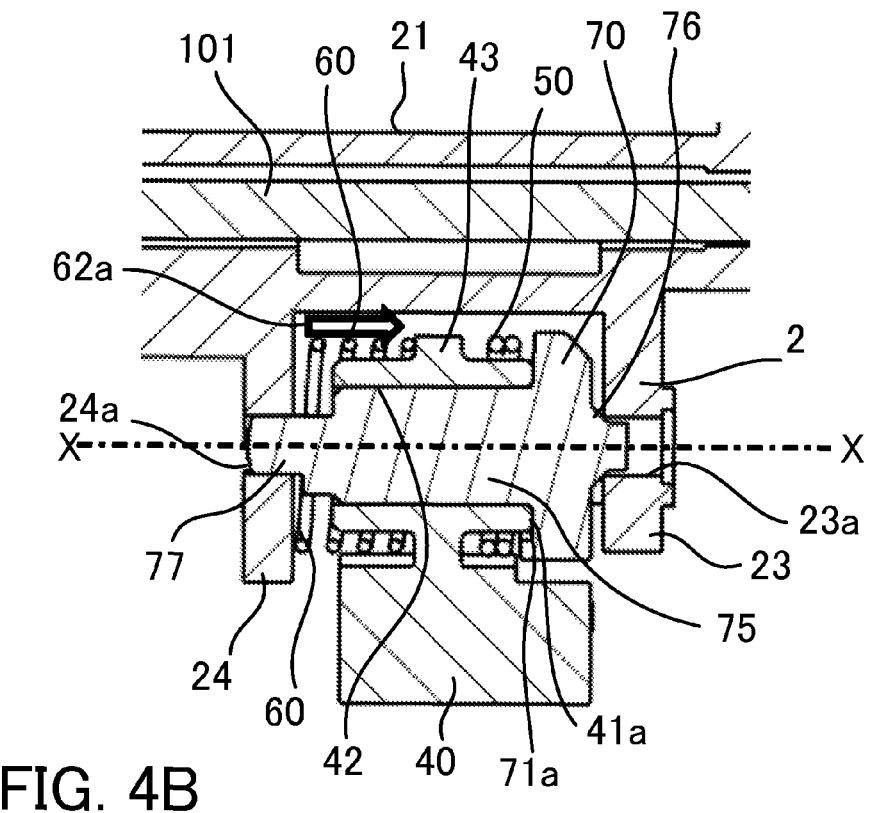

FIG. 4A is a partially enlarged perspective diagram around the rack 7 in FIG. 2, and FIG. 4B is a cross-sectional view along the central axis of the shaft 75 in FIG. 4A. As illustrated in FIG. 4B, the block 23 is provided with the through-hole 23a, the block 24 is provided with a through-hole 24a, and the central axes of the through-holes 23a and 24a coincide with the X-X axis indicated by the dashed and single-dotted line parallel to the optical axis. The X-X axis functions as the rotating axis of the rack 7. The rack 7 as a whole is rotatable about the X-X axis, and the sub rack 40 is rotatable about the same axis with respect to the main rack 70. The shaft 75 has a tapering part 76 inserted into the through-hole 23a and a cylindrical part 77 of a substantially cylindrical shape inserted into the through-hole 24a.

The sub rack (second member) 40 includes the body 41 and an engaged member 44, and prevents a tooth jump due to a disturbance impact such as a drop. The sub rack 40 is configured to be rotatable with respect to the main rack 70.

The body 41 has a shape of a combination of cylinders of different sizes with their central axes coinciding and includes the shaft hole 42 having a cylindrical shape around the central axes. The shaft 75 of the main rack 70 is inserted into the shaft hole 42. The body 41 includes, around its center, a flange 43 having a diameter larger than those of neighboring cylinders. The flange 43 separates a housing for the pinching spring 50 from a housing for the torsion coil spring 60.

In FIGS. 4A and 4B, the pinching spring 50 is disposed between the flange 43 and the contact surface 71a of the engaged member 71, and the torsion coil spring 60 is disposed between the flange 43 and the block 24. The torsion coil spring 60 applies a force on the flange 43. The flange 43 includes an arm 43a extending in the optical axis direction. In the present embodiment, the arm 43a is disposed opposite the motor 8 with respect to line T-T to be described later (between line T-T and the optical axis).

The engaged member 44 projects out of the body 41 and extends substantially in parallel to the optical axis. An opposite tooth 45 is formed on the lead screw side of the engaged member 44. The opposite tooth 45 is configured to be engageable with the lead screw 8a.

As illustrated in FIG. 3A, two stoppers (restricting units) 46 are formed inside (on the body 41 side) of the engaged member 44 as protrusions from the opposite tooth 45. The stoppers 46 contact the respective stoppers 74 of the main rack 70 to prevent further rotation of the engaged member 44 toward the lead screw. Thus, even when the pinching spring 50 applies a force between the engaged members 71 and 44, the opposite tooth 45 does not contact the lead screw 8a in a normal state. The protrusions as stoppers may be provided to at least one of the engaged members 71 and 44.

The pinching spring 50 is a second, forcing unit that applies a force between the engaged member 71 and the sub rack 40 so that the main tooth 72 and the opposite tooth 45 come closer to each other around the X-X axis as a rotational center. The pinching spring 50 is formed of, for example, a torsion spring. The pinching spring 50 is disposed between the flange 43 of the sub rack 40 and the contact surface 71a of the engaged member 71 and includes the coil 51, the arm 52, and an arm 53. The shaft 75 of the main rack 70 penetrates through the coil 51. As illustrated in FIGS. 2, 4A, and 4B, the arm 52 is engaged with the surface 73 of the main rack 70, and the arm 53 is engaged with the arm 43a of the flange 43 of the sub rack 40. As described later, a part at which the arm 52 of the pinching spring 50 forces the engaged member 71 and a part at which the arm 53 of the pinching spring 50 forces the arm 43a of the sub rack 40 are disposed opposite the zoom motor 8 with respect to line T-T to be described later (between the optical axis and line T-T).

The torsion coil spring 60 is a first forcing unit configured to apply a force to the main tooth 72 against the lead screw 8a. The torsion coil spring 60 includes the coil 61, the arm. 62, and an arm 63. The shaft 75 of the main rack 70 penetrates through the coil 61. As illustrated, in FIGS. 2, 4A, and 4B, the arm 62 is engaged with the surface 73 of the main rack 70. The arm 63 is engaged with the sleeve 21 of the first movable member 2. A part at which the arm 62 of the torsion coil spring 60 forces the engaged member 71 is disposed opposite the zoom motor 8 with respect to line T-T to be described later (between the optical axis and line T-T). A part at which the arm 63 of the torsion coil spring 60 forces the first, movable member 2 is preferably disposed opposite the zoom motor 8 with respect, to line T-T to be described later (between the optical axis and line T-T).

The torsion coil spring 60 applies an elastic force in the axis direction between the block 24 and the flange 43 and forces the first movable member 2, the guiding bar 101, the rack 7, and the lead screw 8a in a direction parallel to the optical axis. This puts backlash to one side, thereby preventing the backlash in fitting and engagement.

Specifically, a force 62a of the torsion coil spring 60 in the optical axis direction is applied to the sub rack 40 in the direction illustrated in FIG. 4B. As a result, a contact, surface 41a that is a surface of the body 41 on the contact surface 71a side as illustrated in FIGS. 3B and 4B is forced to contact the contact surface 71a of the engaged member 71, thereby preventing a phase shift between the main tooth 72 and the opposite tooth 45. The force 62a of the torsion coil spring 60 is also used to force the tapering part 76 of the main rack 70 against the shaft hole 23a of the first movable member 2, thereby preventing the backlash as the first movable member 2 moves in the optical axis direction.

Figure 5:
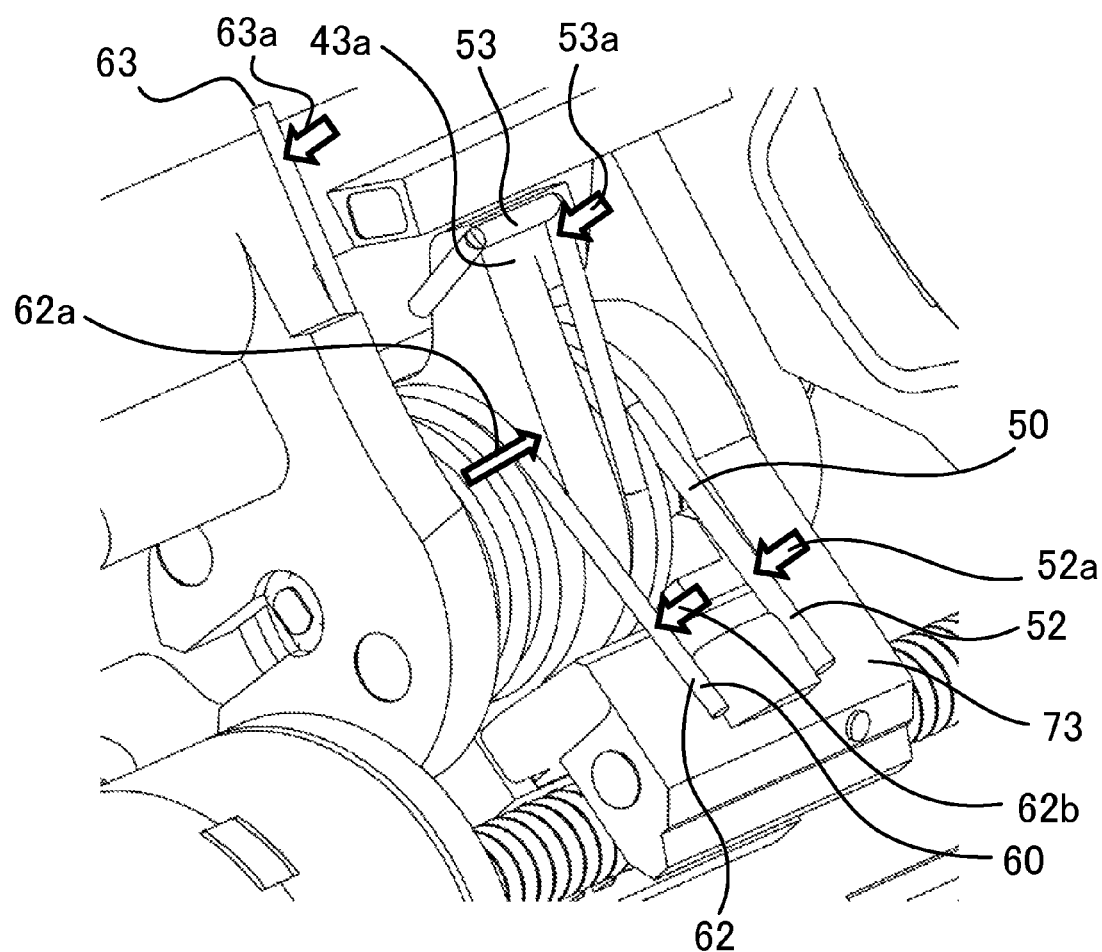
FIG. 5 is a partially enlarged diagram of FIG. 2.

FIG. 5 is a partially enlarged perspective diagram of FIG. 2 around the rack 7 mounted to the first movable member 2.

When the first movable member 2 is temporarily assembled, the main rack 70 is forced around the X-X axis by a force 62b of the torsion coil spring 60, and the main tooth 72 of the main rack 70 and the lead screw 8a of the zoom motor 8 are engaged compressively with each other. The moving member 2 removes backlash between the sleeve 21 and the baffle 22 and the guiding bars 101 and 102 using a force 63a at the other end of the torsion coil spring 60, allowing the moving member 2 to move accurately with respect to the guiding bars 101 and 102.

The pinching spring 50 applies a force 53a to the arm 43a of the sub rack 40 through the flange 43 to generate a rotational force around the X-X axis as a rotational center, thereby bringing the stoppers 46 and the stoppers 74 of the main rack 70 into contact with each other. The main rack 70 is forced by a force 52a from the arm 52 of the pinching spring 50.

FIG. 6A is a side view of FIG. 2 when viewed from the right side. The line T-T indicated by the dashed and single-dotted line is a straight line connecting the X-X axis (the central axis of the shaft 75) and the central axis of the lead screw 8a on a plane perpendicular to the X-X axis and the central axis of the lead screw 8a. As illustrated in FIG. 6A, each of a part at which the force 62b of the arm 62 of the torsion coil spring 60 is applied and a part at which the force 52a (illustrated in FIG. 5) of the arm 52 of the pinching spring 50 is applied, is disposed between the line T-T and the optical axis O (opposite the zoom motor 8 with respect to the line T-T). In FIG. 6A, only the arm 52 of the pinching spring 50 is visible, and the arm 62 of the torsion coil spring 60 is disposed behind it.

FIG. 6B is a side view of a configuration to be compared to that in FIG. 6A in the present embodiment. FIG. 6B differs from FIG. 6A in that the arm 52 of the pinching spring 50 is disposed as an arm 52' on the sub rack 40 side. In the configuration illustrated in FIG. 6B, the arm 52' is not disposed between line T-T and the optical axis O.

The size accuracy of a spring is lower than those of the sub rack 40 of the rack 7 and a motor plate 8b, and thus a distance s between the pinching spring 50 and the motor plate 8b needs to be increased. In other words, the distance between the lead screw 8a and the motor plate 8b needs to be made larger than a distance h1 illustrated in FIG. 6A, which causes an increase of a size of the zoom motor 8. When the movement mechanism of the first movable member 2 includes the two guiding bars 101 and 102, the lead screw 8a, and the rack 7 as in the present embodiment, the position and the size of the zoom motor 8 are likely to determine the whole size. The arrangement of the present embodiment illustrated in FIG. 6A only requires an outside diameter R1 of a product, but the arrangement illustrated in FIG. 6B requires a larger outside diameter R2.

FIG. 6C is a side view of another configuration to be compared to that in FIG. 6A. FIG. 6C differs from FIG. 6A in that, the arm 53 of the pinching spring 50 is disposed as an arm 53' on the sub rack 40 side with an arm 43a' disposed on the back side of the sub rack 40. In the configuration illustrated in FIG. 6C, the arm 53' is not disposed between line T-T and the optical axis O.

The configuration illustrated in FIG. 6C has a lower space efficiency than that of the configuration illustrated in FIG. 6A (still higher than that of the configuration illustrated in FIG. 6B). The arm 43a' and the sleeve 21 are installed in an arrow direction illustrated in FIG. 6D to avoid interference between them, but this method may cause a flaw and contamination on a neighboring optical element such as the second lens unit L2.

For this reason, the configuration illustrated in FIG. 6A is advantageous in downsizing and assembly.

Next follows a description of a function of the rack 7 when it receives an impact such as disturbance. FIGS. 7A to 7C are enlarged side views of engaged members of the lead screw 8a and the main tooth 72.

FIG. 7A illustrates a state (hereinafter, also referred to as a normal state) in which the main tooth 72 is engaged with the lead screw 8a and the opposite tooth 45 is separated from the lead screw 8a in a normal operation. The opposite tooth 45 is kept, separated from the lead screw 8a because of the stoppers 74 and 46 being in contact, with each other. As described later, the stoppers 74 and 46 restricts the distance between the opposite tooth and the lead screw 8a so that a distance d between the main tooth 72 and the opposite tooth 45 is smaller than an outside diameter D of the lead screw 8a. The main tooth 72 and the opposite tooth 45 have shapes corresponding to the thread shape of the lead screw 8a.

FIG. 7B illustrates a state in which the main tooth 72 climbs up the thread of the lead screw 8a when the first movable member 2 receives an impact having an impact value A in the optical axis direction. The impact, value A is larger than the force of the pinching spring 50, initiates an opening operation of extending the distance between the main rack 70 and the sub rack 40, and causes the opposite tooth 45 of the sub rack 40 forced by the pinching spring 50 to come closer to the thread of the lead screw 8a. However, the distance d between the main tooth 72 and the opposite tooth 45 on a plane passing through the central axis of the lead screw 8a and the contact position of the main tooth 72 and the lead screw 8a is smaller than the height D of the thread of the lead screw 8a (d<D). Thus, the main tooth 72 and the opposite tooth 45 are both engaged with the thread of the lead screw 8a, thereby preventing the rack 7 from shifting in the axis direction of the lead screw 8a.

The opposite tooth 45 does not contact the lead screw 8a in the normal state, but contacts it on impact that would otherwise cause a tooth jump between the main tooth 72 and the opposite tooth 45. Thereby, the opposite tooth 45 prevents a tooth jump of the rack 7. Without the opposite tooth 45, a stronger force applied by the torsion coil spring 60 is required to prevent a tooth jump, but such a configuration leads to an increase in frictional force between the rack and the lead screw and hence an increase in the rotational load on the zoom motor, which hinders power saving of the motor. Alternatively, the size of the motor, and hence the size of the lens barrel, need to be increased. This embodiment solves this problem with the opposite tooth 45 disposed as described above.

FIG. 7C illustrates a state in which the first movable member 2 receives an impact having an impact value B in the optical axis direction. The impact, value B is larger than the impact value A (A<B). This means that, the impact value B initiates an opening operation of making the distance between the main tooth 72 and the opposite tooth 45 larger than the outside diameter D of the lead screw 8a. The resistance from the thread of the lead screw 8a applies a force in a direction to separate the main tooth 72 and the opposite tooth 45 from each other. When this force exceeds the force of the pinching spring 50, an opening operation is initiated between the main rack 70 and the sub rack 40. Consequently, the distance between the main tooth 72 and the opposite tooth 45 is increased to d'. The magnitude relation among D, d, and d' is expressed as $d<D \leq d'$.

This allows a tooth jump such that the main tooth 72 moves over the thread of the lead screw 8a in the axis direction. This tooth jump prevents chip and flake of the main tooth and the lead screw due to a large shearing force otherwise applied on the tooth tips of the main tooth 72 and the opposite tooth 45. This breakage can destabilize the operation of the product or cause operational failure. The force of the torsion coil spring 60 is weaker than the force of the pinching spring 50. This ensures contact of the opposite tooth 45 with the lead screw 8a in a case of an impact of value A or more and less than B, thereby preventing a tooth jump. In the present embodiment, any value B can be set by adjusting the force of the pinching spring 50.

The engaged members 71 and 44 are disposed relatively movable to allow at least one of the main tooth 72 and the opposite tooth 45 to become separated from the lead screw 8a against the force applied by the pinching spring 50. If the opposite tooth 45 is immovable, the rack tooth has a large shearing force applied on its tip to be potentially flaked on very strong impact, thereby causing operational failure. This embodiment solves this problem by separating at least one of the main tooth 72 and the opposite tooth 45 from the lead screw 8a on very strong impact having the impact value B or higher.

As described above, the driving power of the motor 8 is transferred to the moving member 2 through the main tooth 72 in the normal state. On impact less than, the impact value B due to a drop for example, the main tooth 72 and the opposite tooth 45 become engaged with the thread of the lead screw 8a and prevent a tooth jump of the rack 7 and hence a shift of the first movable member 2 in the optical axis direction. On impact having the impact value B or higher, the opening operation initiates between the main rack 70 and the sub rack 40 and allows a shift, of the first movable member 2 in the optical axis direction, thereby preventing the breakage of the main tooth 72. The present, invention is applicable not only when the main tooth 72 and the opposite tooth 45 are orthogonal to the central axis of the lead screw 8a but also when they have a lead angle.

According to this embodiment, the lead screw 8a contacts the main tooth 72 but there is no tooth on the opposite side in the normal state. When the lead screw contacts only the main tooth, a stronger force needs to be applied on the main tooth for stable movements of the rack. This configuration potentially leads to an increased rotational load on the motor and hence hinders power saving of the motor, or leads to an increased size of the motor and hence the size of the lens barrel. Accordingly, the present invention may further include a member including a pinching tooth that contacts the lead screw 8a on the opposite side of the main tooth in the normal state. In this configuration, the main tooth 72 and the pinching tooth sandwich the lead screw 8a by the force of the torsion coil spring 60, and transfer driving power due to rotation of the lead screw 8a to the first movable member 2. The pinching tooth may be disposed on the sub rack 40, which allows reduction in the number of components.

The rack 7 in this embodiment constitutes part of a moving unit configured to move the second lens unit L2, but may constitute a moving unit, configured to move the fourth lens unit L4. In this configuration, the lead screw 11a is engaged with the rack mounted to the second movable member 4, and the rotation of the rotor drives the fourth lens unit L4 in the optical axis direction. The torsion coil spring puts to one side backlash of each of the second movable member 4, the guiding bars, the rack, and the lead screw, thereby preventing backlash in fitting and engagement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to various kinds of industrial products including a rack and a lead screw.

This application claims the benefit of Japanese Patent Application No. 2013-129414, filed Jun. 20, 2013, which is hereby incorporated by reference herein in its entirety.

What is claimed is:

1. A rack mounted to a movable member including a lens unit and configured to transfer a driving power of a driver to the movable member, the rack comprising:
 a first member including a main tooth to be engaged with a lead screw rotated by the driver;
 a second member including an opposite tooth disposed opposite the main tooth with respect to the lead screw and engageable with the lead screw, the second member being rotatable with respect to the first member;
 a first forcing unit configured to force the main tooth against the lead screw; and
 a second forcing unit configured to force the main tooth and the opposite tooth closer to each other,
 wherein on a plane perpendicular to the central axis of the lead screw, each of an area on which the first forcing unit contacts the first member, an area on which the second forcing unit contacts the first member, and an area on which the second forcing unit contacts the second member is disposed on an optical axis side of the lens unit with respect to a straight line connecting a rotating axis of the second member and the central axis of the lead screw.

2. The rack according to claim 1, wherein an area on which the first forcing unit contacts the movable member is disposed on the optical axis side of the straight line.

3. The rack according to claim 1, wherein a force applied by the first forcing unit is weaker than a force applied by the second forcing unit.

4. The rack according to claim 1, wherein the first forcing unit applies an elastic force in a direction of the rotating axis.

5. The rack according to claim 1, wherein the first forcing unit is a torsion coil spring.

6. The rack according to claim 1, wherein the second forcing unit is a pinching spring.

7. The rack according to claim 6, wherein the pinching spring is a torsion spring.

8. The rack according to claim 1, further comprising a restricting unit configured to restrict a distance between the opposite tooth and the lead screw so that the opposite tooth is separated from the lead screw and a distance between the main tooth and the opposite tooth on a plane passing through the central axis of the lead screw and a contact position between the main tooth and the lead screw is smaller than an outside diameter of the lead screw, when the main tooth is engaged with the lead screw by a force applied by the first forcing unit.

9. The rack according to claim 8, wherein the restricting unit includes a protrusion provided to at least one of the first engaged member and the second engaged member.

10. The rack according to claim 1, further comprising a member disposed opposite the main tooth with respect to the lead screw and including a pinching tooth engaged with the lead screw.

11. The rack according to claim 1, wherein the second member is a pinching tooth disposed opposite the main tooth with respect to the lead screw and to be engaged with the lead screw.

12. An optical apparatus comprising a rack mounted to a movable member including a lens unit and configured to transfer driving power of a driver to the movable member,
wherein the rack includes:
a first member including a main tooth to be engaged with a lead screw rotated by the driver;
a second member including an opposite tooth disposed opposite the main tooth with respect to the lead screw and engageable with the lead screw, the second member being rotatable with respect to the first member;
a first forcing unit configured to force the main tooth against the lead screw; and
a second forcing unit configured to force the main tooth and the opposite tooth closer to each other,
wherein on a plane perpendicular to the central axis of the lead screw, each of an area on which the first forcing unit contacts the first member, an area on which the second forcing unit contacts the first member, and an area on which the second forcing unit contacts the second member is disposed on an optical axis side of the lens unit with respect to a straight line connecting a rotating axis of the second member and the central axis of the lead screw.

13. The optical apparatus according to claim 12, wherein an area on which the first forcing unit contacts the movable member is disposed on the optical axis side of the straight line.

14. The optical apparatus according to claim 12, further comprising a restricting unit configured to restrict a distance between the opposite tooth to the lead screw so that the opposite tooth is separated from the lead screw and a distance between the main tooth and the opposite tooth on a plane passing through the central axis of the lead screw and a contact position between the main tooth and the lead screw is smaller than an outside diameter of the lead screw, when the main tooth is engaged with the lead screw by a force of the first forcing unit.

15. The optical apparatus according to claim 14, wherein the restricting unit is provided to at least one of the first engaged member and the second engaged member.

16. The optical apparatus according to claim 12, wherein the optical apparatus includes an image pickup apparatus.

17. The optical apparatus according to claim 12, wherein the optical apparatus is a lens barrel detached from and attached to an image pickup apparatus.

* * * * *